United States Patent

[11] 3,590,228

| [72] | Inventor | Jack A. Burke |
| | | Houston, Tex. |
| [21] | Appl. No. | 672,267 |
| [22] | Filed | Oct. 2, 1967 |
| [45] | Patented | June 29, 1971 |
| [73] | Assignee | Schlumberger Technology Corporation |
| | | Houston, Tex. |

[54] METHODS AND APPARATUS FOR PROCESSING WELL LOGGING DATA
22 Claims, 6 Drawing Figs.

[52] U.S. Cl. .................................................235/151.35,
324/1, 340/15.5
[51] Int. Cl. ......................................................G01v 1/28
[50] Field of Search............................................235/184,
185, 151.35; 250/83.3; 324/1; 340/15.5

[56] References Cited
UNITED STATES PATENTS
3,166,708 1/1965 Millican ........................ 324/1
3,373,280 3/1968 Mills, Jr............. ........... 250/83.3
3,406,359 10/1968 Welz et al...................... 324/1

*Primary Examiner*—Malcolm A. Morrison
*Assistant Examiner*—Edward J. Wise
*Attorneys*—Steward F. Moore, Jerry M. Presson, Donald H. Fidler, Leonard R. Fellen, Edward M. Roney, William R. Sherman and William J. Beard

ABSTRACT: The particular embodiments described herein as illustrative of the invention describe a technique for processing well-logging measurements to provide more meaningful information as to earth formation conditions. In this regard, measurements of sonic travel time, bulk density, and neutron derived porosity of the earth formations are combined to provide certain lithology indices. These lithology indices are then utilized to identify the major lithological constituents of any given formation. Once the major lithological constituents are identified, the percentages of the lithological constituents and porosity of a formation can be accurately calculated.

Jack A. Burke
INVENTOR.

BY Edward M. Roney
ATTORNEY

Jack A. Burke
INVENTOR.

BY Edward M. Roney
ATTORNEY

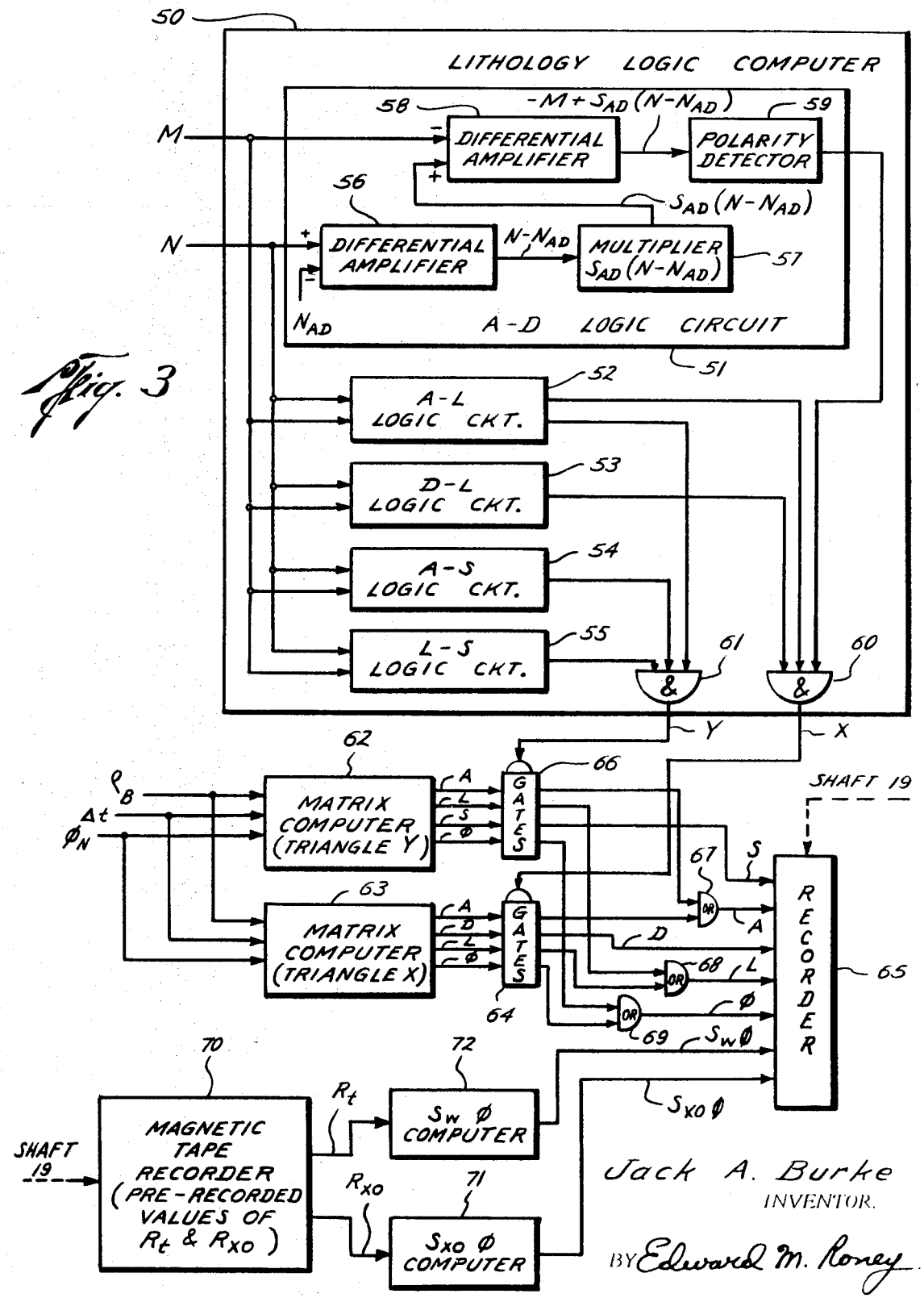

METHODS AND APPARATUS FOR PROCESSING WELL LOGGING DATA

This invention relates to methods and apparatus for investigating earth formations traversed by a borehole. More particularly, the invention relates to the processing of well-logging data derived from apparatus lowered in a borehole for investigating the subsurface earth formations.

In seeking to determine the presence and depth of hydrocarbon bearing zones (oil, gas, etc.,) that may exist in the subsurface earth formations adjacent to a borehole drilled into the earth, various types of exploring devices may be lowered into the borehole for measuring various properties of the formations adjacent the borehole. The three principle types of such exploring devices are electrical exploring devices (either electrodes or induction coils), sonic exploring devices, and radioactivity exploring devices (gamma ray, neutron, etc.).

The electrical exploring devices measure the electrical resistivities (or conductivities) of the earth formations. These electrical resistivities are determined primarily by the amount, distribution and resistivity of the fluid or fluids contained in the formation pore spaces. The sonic-exploring devices, on the other hand, measure the time required for sonic waves to travel across a given span of the earth formation. This sonic travel time is determined primarily by the nature of the rock structure and particularly its porosity. The radioactivity exploring devices measure either the natural radioactivity of the formations or the radioactivity induced therein by bombardment of the formations with radioactivity particles or rays.

Two particular radioactivity exploring devices used to investigate formations are the formation density-logging tool and the neutron-logging tool. The formation density-logging tool emits gamma rays which are diffused through the formation and the number of diffused gamma rays reaching one or more nearby detectors are counted to provide a measure of the electron density of the adjacent formation. Moreover, it is known that this electron density is very closely proportional to the bulk density of the formation in substantially all cases. (For cases where this proportionality does not apply, appropriate corrections can be made).

The neutron tool on the other hand utilizes a source for emitting neutrons into the adjacent formations. In one form of neutron device, these neutrons lose energy by collision with atoms in the formation. When the energy level of these neutrons is reduced to the epithermal energy range, they can be detected by a nearby detector, which counts the number of epithermal neutrons. Since hydrogen atoms are the only ones whose weights are almost equal to that of the neutron, they are the most effective in reducing the energy level of the neutrons to enable their capture. Thus, it can be said that this type of neutron log is essentially a record of the hydrogen atom density of the rocks surrounding the borehole. Since the formation pore spaces are generally filled by either water or liquid hydrocarbons which have about the same amount of hydrogen, the neutron log does not distinguish between oil and water, but is primarily effected by the formation porosity.

In general, none of these measurements taken alone give a direct and positive indication as to the presence or amount of hydrocarbons in the formations or the relative difficulty in removing these hydrocarbons. The various factors which effect each measurement have to be taken into account and an interpretation or deduction made as to the probable existence of hydrocarbons. Among the factors which are considered to be important in determining the location, amount, and ease of removal of oil are the porosity and lithology of the formations. Porosity is the fraction of the total volume of a given portion of the formation which is occupied by pores, or void spaces. Lithology, on the other hand, concerns the type of solid material, (i.e., sandstone, limestone, dolomite, etc.) present in the formations.

It is known that by combining the measurements derived from the formation density log, the sonic log, and the neutron log, three independent measurements of certain physical properties of the formations can be obtained. Since the relationships for porosity and lithology for each of these logs are well known, simultaneous solutions of the equations for the three logging tools can be made to provide representations of porosity and lithology. Additionally, since it is known that the sum of all of the lithologic constituents plus porosity must equal one, there are in reality four equations and thus the solution of four unknowns can be obtained from such a 4 to 4 matrix. By so doing, solutions can be obtained for the percentage of volume of the formations contributed by the three lithologic constituents and porosity.

However, the accuracy of the above solution depends on the correct choice of the particular lithologic constituents or components which are to be used in the simultaneous solutions of the equations. While many times it may be known which lithologic constituents are present in the formations, there are many cases where this is not known. In this regard, it would be desirable to be able to accurately select the lithologic components which are to be used in the simultaneous solutions of the four equations.

It is therefore an object of the present invention to provide new and improved methods and apparatus for processing well-logging data derived from subsurface earth formation investigating apparatus.

It is a further object of the present invention to provide new and improved methods and apparatus for determining the lithology and porosity of earth formations adjacent a borehole.

In accordance with the present invention, methods and apparatus for processing well-logging data comprises obtaining measurements representative of a plurality of characteristics of the adjoining formations and computing certain lithology indices from said measurements. These lithology indices can then be used for determining which lithological constituents are present in the adjoining formations or they can be recorded as a function of borehole depth for subsequent use.

For a better understanding of the present invention, together with other and further objects thereof, reference is had to the following description taken in connection with the accompanying drawings, the scope of the invention being pointed out in the appended claims.

Referring to the drawings:

FIG. 3 shows a schematic representation of another embodiment of the present invention for carrying out the operation depicted in FIG. 2;

Figure 1:
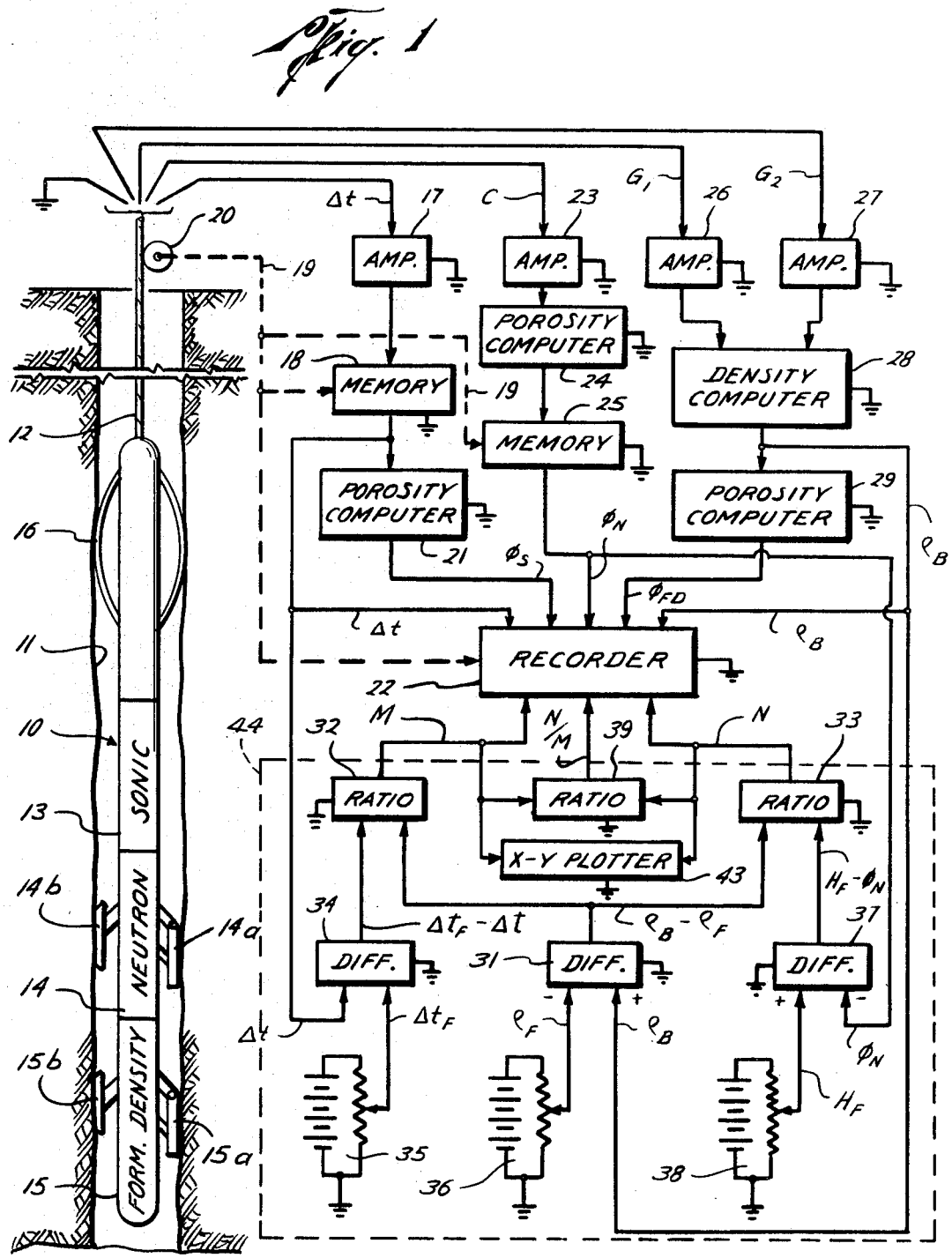
FIG. 1 shows an investigating apparatus having a plurality of exploring devices for investigating the adjoining earth formations along with a schematic representation of apparatus for processing the well-logging signals derived from the investigating apparatus.

Now referring to FIG. 1, there is shown an investigating apparatus 10 located in a borehole 11 on the end of an armored multiconductor cable 12 which is raised and lowered in the borehole by suitable drum and winch mechanism-(not shown). The investigating apparatus 10 includes a suitable sonic exploring device 13 for measuring the acoustical travel time of the formations. Sonic exploring devices of this type can be found in U.S. Pat. No. 2,938,592 granted to C. J. Charske et al. on May 31, 1960 and U.S. Pat. No. 3,231,041 granted to F. P. Kokesh on Jan. 25, 1966. The downhole investigating apparatus 10 also includes a sidewall epithermal neutron exploring device 14, having a source and detector mounted in a skid 14a, for measuring the hydrogen content of the adjoining formations and thus the porosity of the adjoining formations. Exploring devices of this type can be found in U.S. Pat. No. 2,769,918 granted to C. W. Tittle on Nov. 6, 1956 and copending application Ser. No. 588,400 by Harold Sherman and Jay Tittman filed on Oct. 21, 1966. If desired, a conventional neutron exploring device could be utilized in place of the sidewall epithermal neutron device. In such a neutron tool, neutrons emitted into a formation are captured by certain types of atoms in the formation which results in the emission of very high energy level gamma rays, called capture gamma rays. These capture gamma rays are counted by a nearby detector. This type of neutron tool is also responsive to the hydrogen content of the formation.

The investigating apparatus 10 also includes a formation density exploring device 15 for producing well-logging measurements which can be utilized to calculate the bulk density of the adjoining formations. In this regard, a skid 15a houses a source and two detectors spaced different distances from the source. This arrangement of source and detectors produces signals that correspond to the bulk density of the earth formation 13. The theory, construction and operation of the gamma ray measuring device 23 are described more completely in "-Dual Spacing Formation Density Log" by J. S. Wahl, J. Tittman, C. W. Johnstone and R. P. Alger, Journal of Petroleum Technology, Dec. 1964, pages 1411 —1416; "The Physical Foundations of Formation Density Logging (Gamma-Gamma)" by J. Tittman and J. S. Wahl, Geophysics, Apr. 1965, pages 284 —294; "Formation Density Log Applications in Liquid-Filled Holes" by R. P. Alger, L. L. Raymer, Jr., W. R. Hoyle and M. P. Tixier, Journal of Petroleum Technology, Mar. 1963, pages 321 —332; and U.S. Pat. No. 3,321,625 granted on May 23, 1967 to John S. Wahl and assigned to the same assignee as the invention described herein.

To keep the investigating apparatus 10 centered in the borehole, a pair of extendible wall-engaging members 14b and 15b are provided opposite the pad members 14a and 15a. To keep the upper portion of the investigating apparatus 10 centered, a plurality of spaces 16 are provided. A borehole caliper also is combined with the arms which extend the skids 15a and 15b and supplies a signal representatives of borehole diameter to the surface of the earth.

Now concerning the circuitry at the surface of the earth, the signals $G_1$ and $G_2$ derived from the short and long spacing detectors of the formation density tool 15 are in the form of pulses or count rates. These count rate signals $G_1$ and $G_2$ are amplified by a pair of amplifiers 26 and 27 respectively and applied to a density computer 28 which computes the bulk density $\rho_B$ of the adjoining formations. If desired, the caliper signal can be applied to the density computer 28 to be used in the computation of bulk density $\rho_B$. The resulting bulk density signal $\rho_B$ is applied to a porosity computer 29 which computes the porosity, as derived from the bulk density signal, in accordance with the relationship $$\phi_{FD} = \frac{\rho_G - \rho_B}{\rho_G - \rho_F}$$

where $\rho_G$ is the grain density of the formation rock material and $\rho_F$ is the density of the fluid in the pore space in the formation. Both the bulk density $\rho_B$ and formation density derived porosity $\Phi_{FD}$ are recorded by a recorder 22 which is driven as a function of depth by a shaft 19. The shaft 19 is coupled to a rotating wheel 20 which is in contact with the cable 12 so as to rotate in accordance with changes in borehole depth.

The travel time measurement $\Delta t$ derived from the sonic exploring device 13 is supplied to a suitable amplifier 17 which supplies the amplified output signal to a suitable memory 18. The memory 18 acts to store the sonic travel time signals $\Delta t$ for a given depth interval so as to depth synchronize the sonic logging signal $\Delta t$ with the signals derived from the formation density tool 15. The memory 18 could comprises any suitable memory device such as a rotating magnetic or capacitor memory which stores incoming signals for a sufficient interval for subsequent readout. The memory 18 is driven as a function of borehole depth by the shaft 19. The depth synchronized sonic travel time signals $\Delta t$ are supplied to a suitable porosity computer which is arranged to solve Wyllie's time average formula for porosity $\Phi$ (Wyllie's time average formula is $\Phi = K_1 \Delta t - K_2$, where $$K_1 = \frac{V_M V_F}{V_M V_F}$$

and $$K_2 = \frac{V_F}{V_M - V_F}$$

. $V_M$ is defined as sonic velocity in the solid rock material and $V_F$ is the sonic velocity in the fluid contained in the pore space). Both the sonic travel time signal $\Delta t$ and the sonic derived porosity signal $\Phi_S$ are recorded by the recorder 22.

The neutron signal C is in the form of a series of pulses proportional to the hydrogen content, and thus porosity of the adjoining formations. This neutron count rate is supplied via an amplifier 23 to a suitable porosity computer 24 which acts to convert the neutron count rate N to a DC signal proportional to neutron derived porosity $\Phi_N$. This computer can be arranged as shown in the above-mentioned Sherman and Tittman copending application. This neutron derived porosity signal $\Phi_N$ is supplied to a suitable memory 25 driven by the shaft 19. The memory 25 is similar to the memory 18 and acts to depth synchronize the neutron derived porosity signal $\Phi_N$ with the bulk density signal $\rho_B$ and the sonic travel time signal $\Delta t$. This neutron derived porosity signal $\Phi_N$ is also recorded by recorder 22.

The apparatus described thus far represents investigating techniques well known in the well-logging art. However, none of the above-described measurements, taken along, provides a complete answer as to the lithology of the adjoining formations.

In accordance with the present invention, it has been discovered that by computing two unique lithology indices M and N, valuable information as to the nature and lithological content of the formations can be determined. These lithology indices are:

$$M = \frac{\Delta t_F - \Delta t}{\rho_B - \rho_F} \times 10^{-2} \qquad (1)$$

$$N = \frac{H_{F(LMS)} - \phi_N}{\rho_B - \rho_F} \qquad (2)$$

where $\Delta t_F$ is the sonic travel time in the interstitial fluid, $\rho_F$ is the bulk density of the interstitial fluid, $H_{F\,(LMS)}$ is the hydrogen index of the interstitial fluid. $\Delta t_F$, $\rho_F$ and $H_{F\,(LMS)}$ are all constants which are known at the well site, but which can vary for a given situation. The LMS subscript means that the neutron tool is calibrated to zero in limestone.

It has been found that each given lithological constituent has its own unique value of M and N for any given location. Additionally, any given combination of lithological constituents, will have a relatively constant M and N value. Thus, if the lithology indices M and N are computed and recorded as a function of depth, valuable information can be derived from these recorded lithology indices by the well logging analyst. For example, if there is change in lithology, a change in M and/or N will also occur. Additionally, if the values of M and N should be substantially equal to the specific value for any given lithological component, that particular lithological constituent can be immediately determined.

As an example, the lithology indices for a particular set of lithological constituents and measured parameters are shown below in Table I.

TABLE I

| Lithologic constituent | $\Delta t$ | $\rho$ | H | M | N |
|---|---|---|---|---|---|
| Interstitial fluid | 189.0 | 1.0 | 1.0 | | |
| Anhydrite | 50.0 | 2.98 | 0.0 | .71 | .505 |
| Gypsum | 52.6 | 2.35 | 0.49 | 1.01 | .378 |
| Dolomite | 41.7 | 2.87 | 0.03 | .805 | .52 |
| Limestone | 46.0 | 2.71 | 0.0 | .837 | .585 |
| Sandstone | 55.5 | 2.65 | −0.05 | .815 | .65 |

The above quantities may vary both geographically and by geologic horizons. They are, however, known at the well site before the logging run in most cases. That is to say, the particular geological makeup of any given lithologic constituent may differ in different locations. Since the measured quantities derived from the sonic, formation density, and neutron porosity exploring devices for a pure lithologic constituent are generally known locally, the lithology indices for each constituent can readily be calculated from Equations (1) and (2) for any given location.

Referring back to FIG. 1, there is shown a lithology indices computer 44 for computing these lithology indices M and N in accordance with Equations (1) and (2). In the computer 44, the signal proportional to bulk density $\rho_B$ from density computer 28 is applied to the positive input of a differential amplifier 31. A constant magnitude signal proportional to the fluid density $\rho_F$ is supplied to the negative input of differential amplifier 31 from a variable voltage source 36 (variable because $\rho_F$ can vary from well site to well site and sometimes by depth). The output signal $\rho_B - \rho_F$ from differential amplifier 31 is supplied to one input of a pair of ratio circuits 32 and 33.

The sonic travel time signal $\Delta t$ from memory 18 is supplied to the negative input of a differential amplifier 34. A constant magnitude signal proportional to the sonic travel time in the fluid $\Delta t_F$ is supplied to the positive input of differential amplifier 34 from a variable voltage supply 35. (Variable for the same reason as voltage supply 36). The output signal from differential amplifier 34, which is proportional to $\Delta t_F - \Delta t$, is supplied to the other input of ratio circuit 32. The ratio circuit 32 acts to divide the signal proportional to $\Delta t_F - \Delta t$ from differential amplifier 34 by the signal proportional to $\rho_B - \rho_F$ from differential amplifier 31. The output signal from ratio circuit 32 is thus proportional to the lithology index M per Equation (1), which is recorded by recorder 22 as a function of borehole depth.

The signal proportional to neutron derived porosity $\Phi_N$ from porosity computer 25 is supplied to the negative input of a differential amplifier 37. A signal proportional to the hydrogen index of fluid $H_F$ is supplied to the positive input of differential amplifier 37 from a variable voltage source 38 (variable for the same reason as discussed before). The output signal $H_F - \Phi_N$ from difference circuit 37 is supplied to the other input of the ratio circuit 33. Ratio circuit 33 acts to divide the signal proportional to $H_F - \Phi_N$ by the signal proportional to $\rho_B - \rho_F$ and thus provide an output signal to the recorder 22 proportional to the lithology index N. It may also be desirable to record the ratio of the lithology indices M and N. Thus, the signals proportional to the lithology indices M and N are applied to a ratio circuit 39 which provides a signal proportional to the ratio N/M to the recorder 22.

Thus, in operation, as the investigating apparatus 10 is being raised through the borehole, the lithology indices M and N, along with the ratio N/M are recorded by recorder 22 as a function of borehole depth along with the recording of the functions $\Delta t$, $\Phi_S$, $\Phi_N$, $\Phi_{FD}$, and $\rho_B$. This log of the lithology indices will be valuable to indicate if the lithology is remaining substantially constant over given depth intervals and also to indicate at what depth levels the lithology changes. Additionally, if the formations are comprised of substantially one lithological constituent, then the recorded log of the lithology indices will indicate such to be the case.

It has been the practice in the past for well-logging analyst to utilize the sonic travel time measurement $\Delta t$, the neutron derived porosity measurement $\Phi_N$, and the formation density derived measurement for bulk density $\rho_B$ to solve for a more accurate porosity. Additionally, these measurements have been used to solve for percentages of a limited number of lithological constituents of the adjoining formations. How this can be accomplished can be easily explained by writing the equations for $\rho_B$, $\Delta t$ and $\Phi_N$ in terms of the porosity and different lithological constituents. These equations are:

$$k_1 \Delta t = \phi \Delta t_F - D \Delta t_D - A \Delta t_A - G \Delta t_G - \ldots \quad (3)$$
$$k_2 \phi_{N(LMS)} = \phi H_{F(LMS)} - D H_D - A H_A - G H_G - \ldots \quad (4)$$
$$k_3 \rho_B = \phi \rho_F - D \rho_D - A \rho_A - G \rho_G - \ldots \quad (5)$$

where $k_1$, $k_2$, and $k_3$ are calibration constants determined by such things as the tool response. The LMS subscript for $\Phi_N$ specifies that the tool is calibrated to zero response in limestone. The symbols D, A, and G represent the percentages of bulk volume of dolomite, anhydrite, and gypsum respectively and the corresponding subscripts D, A, and G correspond to the response of the particular exploring device to that particular material or lithological constituent. Thus, for example, $\Delta t_F$ is the sonic response to fluid, $H_D$ is the hydrogen index of dolomite, $\rho_A$ is the density of anhydrite, etc. All of these factors ($\Delta t_F$, $H_D$, $\rho_A$, etc.) are constant for a given geographical location. They may vary by horizons (depth), but are generally always known at the well site before beginning the logging run. The +.... represents the fact that there are numerous other materials which may be part of Equations (3), (4), and (5), e.g., limestone, sandstone, etc. It can also be stated that the sum of all of the lithological components plus porosity must equal one. Thus:

$$\Phi + D + A + G + \ldots = 1 \quad (6)$$

Thus, it can be seen that there are four equations, and thus the solution to four unknowns can be provided by simultaneously solving Equations (3) through (6). This means that only three lithological constituents or components plus porosity can be solved for. All other lithological constituents have to be assumed to be nonexistent in the formation. This procedure depends for its accuracy on properly selecting the major lithological components present in the formation. If a wrong assumption is made as to this, the results may very well be completely inaccurate, including the determination of porosity. One reason for this is that the constants (i.e., $\Delta t_D$, $\Phi_A$, $\rho_G$, etc.) are different for each lithological constituent. In addition to the percentage errors, of course, the answer provided by the logging analyst will include a wrong lithological constituent.

Figure 2:
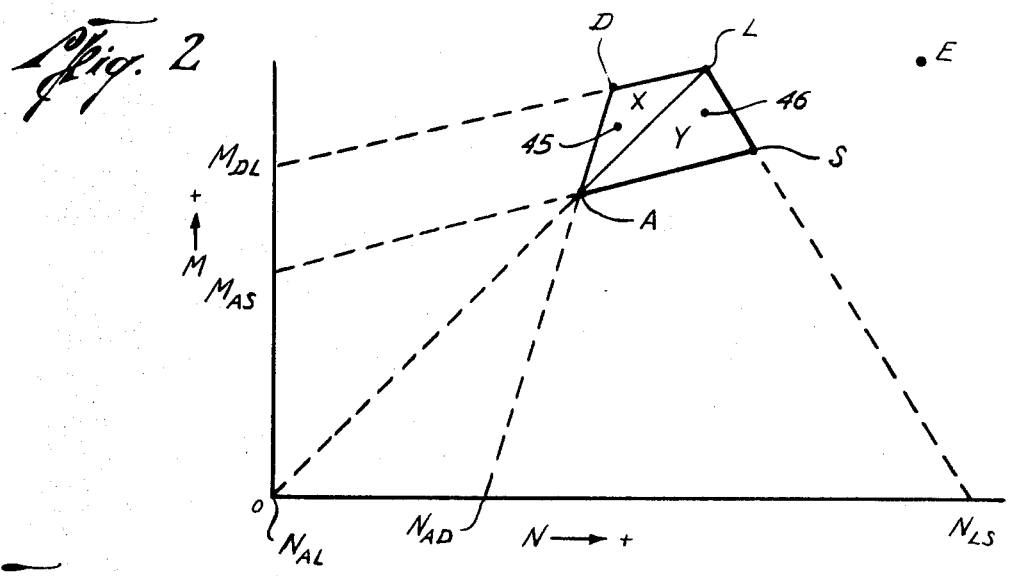
FIG. 2 shows a plot of lithology indices which is useful in explaining certain features of the present invention.

It has been found however that these lithology indices M and N will fairly accurately indicate what the major lithological constituents are and thus provide an accurate solution to the above technique discussed in connection with Equations (3)—(6). Referring now to FIG. 2, there is shown a plot of the two lithology indices M and N where M is plotted on the vertical axis and N on the horizontal axis. The M and N points for various lithological constituents are represented in FIG. 2 by the points designated A, D, L, and S, which correspond to anhydrite, dolomite, limestone, and sandstone respectively. There are of course more lithological components than those represented in FIG. 2, which other lithological components are not shown for the sake of simplicity.

Now, lets assume for the present that the formations will have a combination of either the set of elements A, D, and L or the set A, L and S. In the desired manner of determining what are the major lithological components in the formation, lines are drawn between each of the points A, D and L and A, L and S. Then by plotting the values of the computed lithology indices M and N in FIG. 2 for each depth level in the borehole, the particular triangle which the plotted M,N point falls into determines which set of constituents are the major lithological constituents or components. Thus, for example, if the M,N plot for a given depth level is the point designated 45 in FIG. 2, then the major lithological constituents of this particular depth level are anhydrite, dolomite, and limestone. Likewise, if the plotted point should be the point designated 46, enclosed by the triangle connecting the points, A, L and S, then the major lithological constituents are anhydrite, limestone and sandstone. This plotting of the computed M,N points for each depth level could be accomplished by an X–Y coordinate plotter such as the type manufactured by California Computer Products. This X–Y plotter is shown in FIG. 1 as the X–Y plotter 43 which is responsive to the computed lithology indices M and N.

Thus, in accordance with the previously discussed solution by simultaneous equations, the matrix equations for the plotted point 45 would be:

$$k_1\Delta = \Phi\Delta t_F + A\Delta t_A + D\Delta t_D + L\Delta t_L \quad (7)$$
$$k_2\Phi = \Phi H_f + AHA zDH_D + LH_L \quad (8)$$
$$k_3\rho_B = \Phi\rho + A\rho_A + D\rho_D + L\rho_L \quad (9)$$
$$\Phi + A + D + L = 1 \quad (10)$$

By solving this 4 by 4 matrix represented by Equations (7—10), answers for the percentages of bulk density contributed by porosity $\Phi$, anhydrite A, dolomite D, and limestone L can be calculated. The same procedure can be followed for the plotted point 46 to determine the percentages of porosity, anhydrite, limestone, and sandstone. Likewise, the same procedure can be followed for other lithological constituents such as for example, the lithological components E in the upper right-hand side of FIG. 2. Thus, a triangle could be formed by connecting the points E, L and S.

It may be desirable, in connection with FIG. 2 to solve for the various lithological constituents and porosity on a real time basis, i.e., as the investigating apparatus is moved through the borehole (or on a subsequent playback by a tape recorder). To accomplish this, the computing apparatus must first be able to determine which lithological components to use in the 4 by 4 matrix solution. Thus, the computer must be able to determine which triangle the M,N point is falling into. To accomplish this, it is merely necessary to write the equations for the various lines defining each triangle and simultaneously solve these equations to determine if the calculated lithology indices M and N are enclosed by that triangle.

Thus, the equations for the line connecting the points A and L can be written in terms of the slope of the line and the intersection of the line on either the M or N axis. Thus, writing the equation for the line AL:

$$M - S_{AL}(N - N_{AL}) = 0 \quad (11)$$

where $S_{AL}$ is the slope of the line AL and $N_{AL}$ is the point where the extension of the line AL strikes the N axis. In like fashion, the equations for the lines A–D D and D–L can be written as:

$$-M + S_{AD}(N - N_{AD}) = 0 \quad (12)$$
$$N - S_{DL}(M - M_{DL}) = 0 \quad (13)$$

where $S_{AD}$ and $S_{DL}$ are slopes of the two lines and $N_{AD}$ and $M_{DL}$ are the intersection points for the two lines. Now, given any value of M and N, the solution of Equations (11), (12) and (13) will be either positive or negative depending on which side of the particular line the particular computed M,N point falls (or it will be equal to zero if the point falls right on the line). Equations (11—13) 13) have been written such that all three equations will be positive if a plotted M,N point falls within the triangle X.

The equations for the lines defining the triangle Y can be written as:

$$-M + S_{AL}(N - N_{AL}) = 0 \quad (14)$$
$$-N + S_{AS}(M - M_{AS}) = 0 \quad (15)$$
$$-M + S_{LS}(N - N_{LS}) = 0 \quad (16)$$

where $S_{AS}$ and $M_{AS}$ are the slope and intersection points respectively for the line defined by the points A and S and $S_{LS}$ and $N_{LS}$ are the slope and intersection points respectively for the line defined by the points L and S. The slope $S_{LS}$ will be negative in Equation (16) as can be seen from FIG. 2. Equation (14) is merely a rewritten form of Equation (11) with the signs reversed. Thus, Equations (14), (15) and (16) will all be positive if a plotted M,N point falls within the triangle Y.

Now referring to FIG. 3, there is shown apparatus for determining the major lithological constituents present in any given formation and computing porosity and lithology as percentages of bulk volume. This determination of the major lithological components of the formation by the apparatus of FIG. 3 is performed in accordance with the graphical operation depicted in FIG. 12. Thus, in FIG. 3, the lithology indices M and N, as computed by the apparatus of FIG. 1, are supplied to a lithology logic computer 50. Within the lithology logic computer 50 are a plurality of logic circuits 51, 52, 53, 54 and 55 for solving the various Equations (11) through (16). These logic circuits 51—55 are designated by the particular line equation which they solve. Thus, logic circuit 51 solves equation (12) for the line A–D to determine which side of the line A–D the plotted M,N points fall.

Now, looking in more detail at the logic circuit 51, the computed lithology index N from ratio circuit 33 of FIG. 1 is supplied to the positive input of a difference circuit 56. A constant voltage equal to the intersect point $N_{AD}$ (See FIG. 2) is applied to the negative input of difference circuit 56. The output from the difference circuit 56, which is equal to $N-N_{AD}$ is applied to a multiplier circuit 57 which multiplies the function $N-N_{AD}$ times the slope functions $S_{AD}$ to produce a signal proportional to the function $S_{AD}(N-N_{AD})$. This signal from multiplier 57 is supplied to the positive input of another difference circuit 58. A signal proportional to the lithology index M derived from the ratio circuit 32 of FIG. 1 is supplied to the negative input of the difference circuit 58. The difference circuit 58 then subtracts the applied signals to provide an output signal proportional to $-M+S_{AD}(N-N_{AD})$. This last expression is the expression for the line A–D in Equation (12). The output signal from difference circuit 58 is supplied to a polarity detector 59 which acts to determine if the signal from difference circuit 58 is positive or negative and provide an output signal to an AND gate 60 if the signal is positive.

The logic circuits 52—55 are similar in construction to the logic circuit 51, only the parameters and polarities differing for solving Equations (11) through (13) and (14) through (16). The output signal from the polarity detectors of logic circuits 52 and 53 are also supplied to AND gate 60. Thus, if all of the output signals supplied to AND gate 60 are positive, it is clear that Equations (11) through (13) are positive and thus the particular computed M,N point does, in fact, fall within the triangle X. To determine if a particular M,N point falls within the triangle Y, the outputs from logic circuits 54 and 55 as well as the negative polarity output from logic circuit 52 are supplied to an AND gate 61. This negative polarity output from logic circuit 52 is merely a convenient means for using one logic circuit for the solution of both sets of Equations (11) and (14). That is to say, if the polarity detector of logic circuit 52 is a dual mode polarity detector so as to provide an output on one conductor if the solution of Equation (11) is positive and an output on the other conductor if the solution is negative, then one logic circuit can be utilized for the solution of Equations (11) and (14).

The computed values of sonic travel time $\Delta t$, neutron porosity $\Phi_N$, and bulk density $\rho_B$ from FIG. 1 are all supplied to a pair of matrix computers 62 and 63. The matrix computer 63 is arranged to solve Equations (7) through (9) from the percentage of bulk volume contributed by porosity, anhydrite A, dolomite D, and limestone L. The matrix computer 62, on the other hand, is arranged to provide solutions for the percentages of bulk volume contributed by porosity $\Phi$, anhydrite A, limestone L, and sandstone S. Matrix computers 62 and 63 can be constructed in accordance with the well known design of matrix computers.

It will be recognized that since matrix computer 63 is solving for the set of constituents anhydrite A, dolomite D, and limestone L, that this matrix computer 63 should be operative whenever a plotted M,N point is within the triangle X. Thus, the output signal from AND gate 60 which is representative of the fact that a particular M,N point is located within the triangle X, is utilized to energize a plurality of individual gate circuits 64, which when energized, pass the signals proportional to the percentages of bulk volume contributed by porosity plus the lithologic constituents, anhydrite, dolomite and limestone. In like fashion, the output signal Y from AND gate 61 energizes a plurality of individual gate circuits 66 to which are connected the output conductors from matrix computer 62. These output conductors provide signals proportional to the percentages of bulk volume contributed by porosity, anhydrite, limestone and sandstone.

Since porosity, anhydrite, and limestone are common to the answers provided by both matrix computers 62 and 63, the outputs from gate 64 and 66 which provide the percentage of anhydrite are connected to the input of an OR gate 67; the signals proportional to limestone from gates 64 and 66 are supplied to the input of an OR gate 68; and the output signals from gates 64 and 66 proportional to the porosity Φ are applied to the input of an OR gate 69. Thus, the outputs from OR gates 67, 68 and 69 representative of the computed percentage of anhydrite, limestone and porosity are supplied to a recorder 65 along with the signals representative of the percentages of sandstone and dolomite directly from gates 64 and 66 to provide a recording of these values as a function of borehole depth.

In operation, the apparatus of FIG. 3 will continuously determine what are the major lithological components of the formations under consideration and selectively energize the proper matrix computer to provide the percentages of these lithological constituents plus porosity. In this connection, the computed lithology indices M and N are supplied to the lithology logic computer 50, which acts to determine which triangle X or Y the computed M,N point is enclosed by, and provide an output signal representative thereof. At the same time that the lithology logic computer is determining which are the major lithological components, the measured values of sonic travel time $\Delta t$, neutron porosity $\Phi_N$ and bulk density $\rho_B$ are supplied to matrix computers 62 and 63 which act to continuously compute the percentages of the various lithological constituents and porosity. Then, the lithology logic computer 50 provides one output signal to one of the gate circuits 64 or 66 in accordance with the identification of the major lithological components of the formation so as to provide for recording the proper signals from the matrix computers 62 or 63.

In the FIG. 3 apparatus, if a computed M,N point should fall outside of one of the triangles X or Y, neither AND gate 60 nor 61 will be energized. This can be circumvented by placing a flip-flop on the output of each AND gate 60 and 61, each flip-flop being set by the output of its respective AND gate and reset by the other AND gate. By this means, one of the gates 64 or 66 will be energized at all times. Of course, if desired, more lithologic constituents could be taken into consideration, thus adding more triangles to FIG. 2 and more matrix computers to FIG. 3.

It has been found that the value of porosity determined by the above matrix solution (i.e., by combining the measurements $\rho_B$, $\Delta t$, and $\Phi_N$ in the proper matrix computer) is far more accurate than the porosities $\Phi_N$, $\Phi_S$ and $\Phi_{FD}$ computed from the measurements derived from each of the exploring devices separately. This is true provided that the major lithological components can be accurately identified. If for example, an erroneous decision is made as to which three lithological components contribute the greatest percentage of bulk volume, then the determination of porosity may very well be inaccurate, along with the determination of lithology.

The fact that a more accurate porosity value can be derived by the above technique will substantially improve any other interpretation technique in which porosity is a factor. For example, the method of determining movable oil disclosed in U.S. Pat. No. 3,166,708 granted to M. L. Millican on Jan. 19, 1965 can be improved by utilizing the value of porosity derived from the above disclosed technique in place of the sonic derived porosity shown in the Millican patent. This is represented in FIG. 3 by providing a magnetic tape recorder 70 which has prerecorded values of the resistivity $R_t$ of the noninvaded formation zone along with the resistivity $R_{xo}$ of the flushed zone. (The flushed zone is the zone near the borehole which the drilling mud has invaded and flushed the naturally occurring formation fluids away from the borehole. The noninvaded zone, on the other hand, is the outermost zone from the borehole which has not been invaded by this drilling mud.)

These values of $R_t$ and $R_{xo}$ can be derived by the electrical logging apparatus shown in the Millican patent, as for example, on a prior run in the borehole and recorded on magnetic tape in a well-known manner. This magnetic tape recorder 70 can then be driven by the shaft 19 of FIG. 1 so as to depth synchronize these prerecorded values $R_t$ and $R_{xo}$ with the measurement being presently derived from the downhole investigating apparatus 10. At any rate, the signals proportional to the invaded and noninvaded zone resistivity $R_{xo}$ and $R_t$ are applied to a pair of computers 71 and 72 designated $S_{xo}\Phi$ computer and $S_{tc}\Phi$ computer which can be constructed in accordance with the teachings of the above-mentioned Millican patent. By way of background information, $S_{tc}$ is the water saturation or fractional amount of pore space occupied by water in the noninvaded or uncontaminated zone. $S_{xo}$ on the other hand represents the invaded zone water saturation or fractional amount of pore space in the flushed zone occupied by mud filtrate. Thus, it can be seen that $S_{tc}\Phi$ is the fractional amount of formation volume which is occupied by formation water in the noninvaded portion of the formations. Likewise, $S_{xo}\Phi$ represents the fractional amount of formation volume which is occupied by mud filtrate in the invaded region of the formation. The signals proportional to $S_{xo}\Phi$ and $S_{tc}\Phi$ from computers 71 and 72 are recorded by the recorder 65 as a function of borehole depth.

Figure 4:
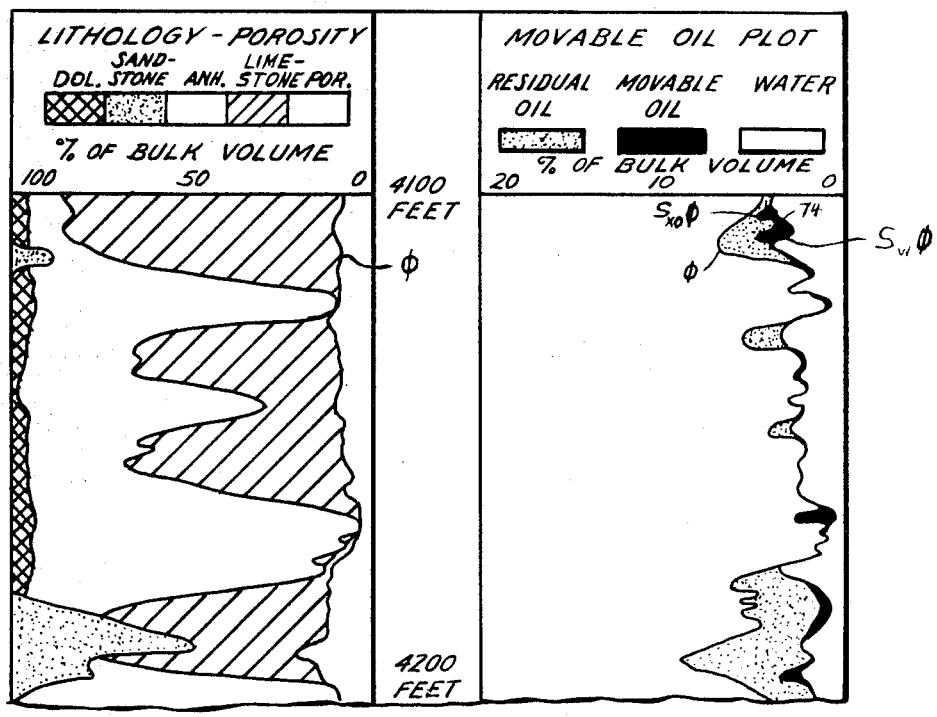
FIG. 4 shows a typical recorded log which could be obtained from the apparatus of FIG. 3.

Now referring to FIG. 4, there is shown a typical log of the values recorded by recorder 65 of FIG. 3. Both the lithology-porosity plot (shown on the left-hand side of FIG. 4) and the movable oil plot (shown on the right-hand side of FIG. 4) are shown as percentages of bulk volume with the depth marks written on the center portion between the two logs. Concerning the lithology-porosity plot, porosity is represented by the clear portion on the right-hand side of the plot and, dolomite, sandstone and limestone are represented by various forms of shading, as shown in the key at the top of the log. Anhydrite is represented as the clear portion of the log to the left of the porosity portion of the plot. In the FIG. 4 situation, it can be seen that there are levels of the formation which vary between sandstone and dolomite. Most of the remainder of the formation is comprised of a combination of limestone and anhydrite.

Now referring to the movable oil plot portion of FIG. 4, there are shown the plots of the quantities $S_{tc}\Phi$, $S_{xo}\Phi$ and $\Phi$. The porosity $\Phi$ curve in this plot is merely a blown-up version of the porosity plot in the lithology-porosity plot on the left-hand side of FIG. 4. It was shown in the above-mentioned Millican patent that the interval between porosity $\Phi$ and the quantity $S_{xo}\Phi$ is representative of the residual or unmoved oil in the formation and the interval between the curves representative of $S_{xo}\Phi$ and $S_{tc}\Phi$ is representative of the movable oil in the formations. On the other hand, the displacement between zero porosity and the $S_{tc}\Phi$ curve is representative of the water in the formation. Thus, as noted in the key at the top of the movable oil plot, the clear portion of this movable oil plot is representative of water, the dark portion is representative of the movable oil and the gray or dotted portion is representative of the residual oil.

Thus, it can be seen from FIG. 4, that the apparatus of FIG. 3 will provide a recorded log giving valuable information as to the lithology and porosity of the formations as well as the percentage of porosity which is filled with water, movable oil, and residual oil. By combining the two plots, it can fairly accurately be determined where to best perforate to produce oil. It is many times known locally that zones containing certain lithologic constituents will not easily produce oil. For example, in some geographical areas, it may be undesirable to produce oil in limestone formations. In FIG. 4, the portion of the movable oil plot, designated 74, which has a fair amount of movable oil might ordinarily be considered to be a desirable zone to perforate. However by noting that this particular formation is composed of primarily limestone, the petroleum engineer will know not to perforate here.

The plot of FIG. 2 and subsequent apparatus of FIG. 3 assume that the major lithological components could be either anhydrite, dolomite and limestone, or anhydrite, limestone and sandstone. If a borehole is being investigated in which there is a possibility of dolomite, limestone and sandstone or anhydrite, dolomite, and sandstone appearing simultaneously as the major lithological components, the apparatus of FIG. 3 would not be able to provide an accurate answer. This can easily be overcome graphically by drawing another line between the lithological components, dolomite and sandstone so as to add third and fourth triangles. Now, looking at FIG. 5, these additional triangles are designated Z and W respectively, the triangles X and Y discussed in connection with FIG. 2 being the same as in FIG. 2. It can be seen from the triangle arrangement of FIG. 5 that if a computed M,N point should appear within the triangle Z, it will have the possibility of being in either the Z or Y triangles, or the Z or X triangles depending on which side of the line A-L the point should fall on. In this case, when only one M,N point is considered, the solution is indeterminate. The same thing goes for the triangles X, Y and W.

Graphically, this problem can be alleviated in accordance with the present invention by plotting a given number of M,N points as by the "X-Y plotter" 43, and determining which triangle has the greatest density of M,N points. To do this, however, values of M and N should first be computed over a given depth interval and the major lithological components for that depth interval identified. Then, the measurements $\Delta t$, $\Phi_N$, and $\rho_B$ have to be made available again to compute the values of porosity and lithology. Thus, if the computed M,N points are plotted by the "X-Y plotter" for a given section of borehole as represented by the plotted points in FIG. 5, it can be seen that all of the triangles have at least some M,N points contained therein. However, it can be seen in FIG. 5 that the triangle Z has the greatest density of plotted M,N points. Thus, in this FIG. 5 situation, the set of major lithological constituents are dolomite D, limestone L, and sandstone S and thus these constituents are used in the matrix solution.

Figures 5, 6:
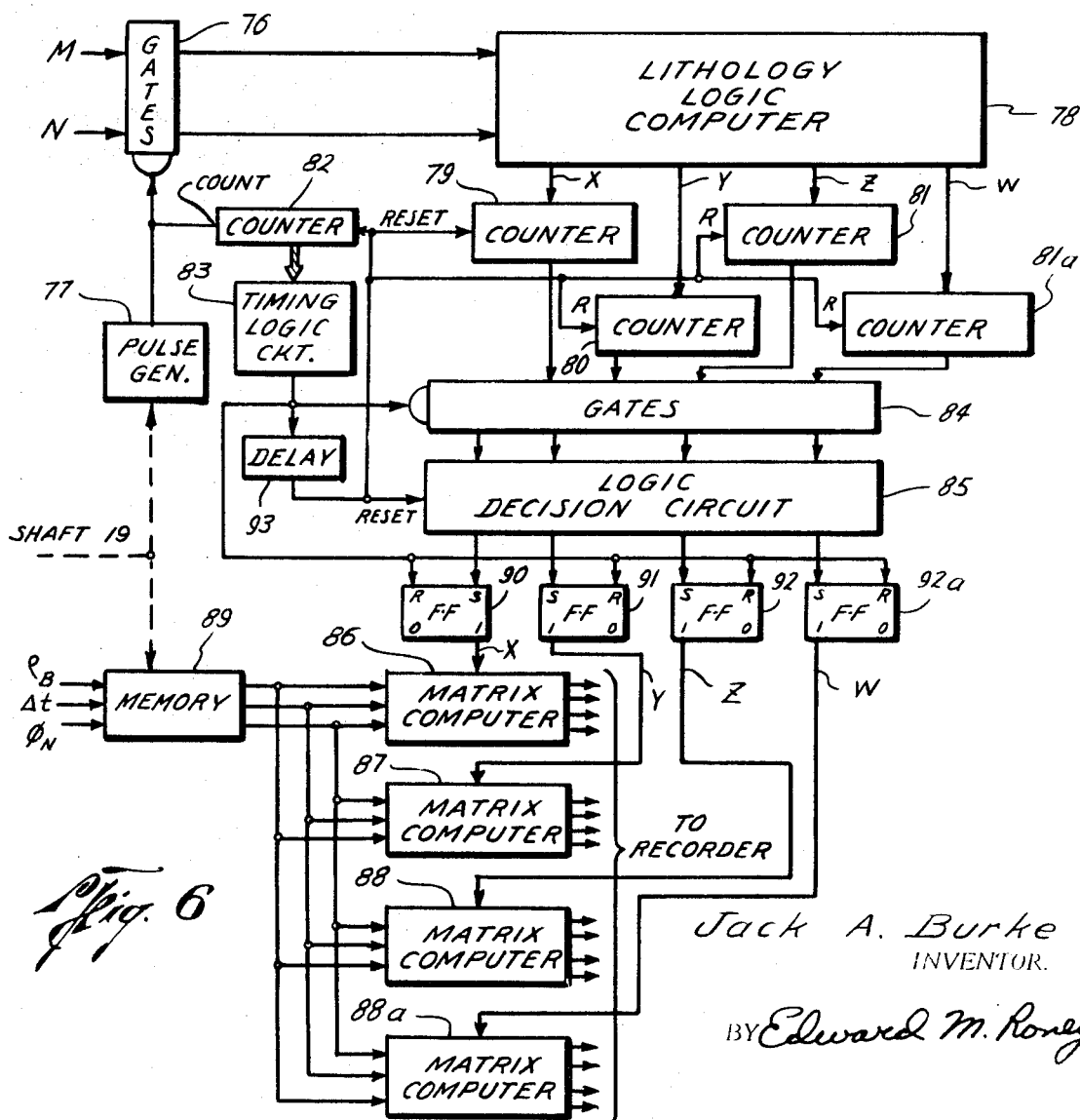
FIG. 5 shows another plot of lithology indices useful in explaining another feature of the present invention.
FIG. 6 shows schematically apparatus for performing the operation depicted in FIG. 5 in accordance with another feature of the present invention.

Now, turning to FIG. 6, there is shown apparatus for performing this operation automatically. The computed M and N points are supplied to a pair of individual gate circuits 76 which gates are energized by output pulses from a pulse generator 77 driven by the shaft 19. Pulse generator 77 will energize the gate 76 at given equal depth intervals so as to apply the computed values of M and N to a lithology logic computer 78. Lithology logic computer 78 is similar to lithology logic computer 50 of FIG. 3 except that lithology logic computer 78 is arranged to determine which one of the triangles X, Y, Z or W, each given M,N point falls within. A plurality of counters 79, 80, 81 and 81a are responsive to the X, Y, Z and W output lines from lithology logic computers 78 so as to count the number of computed M,N points which fall within the respective triangles and thus indicate the density of M,N points in each triangle. Counters 79, 80, 81 and 81a could comprise, for example, binary counters or suitable analog counting arrangements, such as integrators.

The output pulses from pulse generator 77 are also applied to the count input of a binary counter 82 which counts the pulses from pulse generator 77 and thus provides an indication of elapsed depth. A timing logic circuit 83, which could comprise a diode matrix circuit, is connected to the output of counter 82 so as to provide an output signal after a given desired depth interval. This output signal from timing logic circuit 83 is supplied to individual gates of a plurality of gate circuits 84 which, when energized, apply the outputs of counters 79, 80, 81 and 81a to a logic decision circuit 85. Logic decision circuit 85 acts to determine which one of the counters 79, 80, 81 or 81a has accumulated the greatest count and thus, could comprise suitably arranged digital comparators, or if a binary-to-analog converter is employed, suitable analog logic circuits. This type of circuit for determining which one of a plurality of quantities is larger is well known in the art and need not be discussed further. The logic decision circuit 85 thus provides one output signal X, Y, Z or W depending on which counters 79, 80, 81 or 81a has the greatest count and thus which triangles X, Y, Z or W has the greatest density of points.

If the triangle X has the greatest density of M,N points, the control signal X is utilized to set a flip-flop 90, whose "1" output energizes a suitable matrix computer 86, similar to the matrix computers 62 or 63 of FIG. 3. In like fashion, the control signals Y, Z and W are utilized to energize matrix computers 87 and 88r respectively via flip-flops 91, 92 and 92a respectively if one of the triangles Y, Z, or W has the greatest density of computed M,N points.

Instead of going back and rerunning the investigating apparatus 10 through the borehole again after it has been determined what are the major lithological constituents, the measured quantities $\rho_B$, $\Delta t$ and $\Phi_N$ are read into a suitable memory 89 which stores the measurements for a given depth interval and then reads them out to the input of the three matrix computers 86, 87 and 88. The depth interval over which the memory 89 stores these measurements is the same as the depth interval selected for timing logic circuit 83. By this means, once the set of major lithologial constituents are identified, one of the four matrix computers 86, 87, 88 or 88a can begin computing the percentages of bulk volume contributed by the three major lithological constituents and porosity. The outputs of these matrix computers 86, 87, 88 and 88a are then supplied to a suitable recorder via a plurality of OR gates, where necessary, in the same manner as in FIG. 3.

To reset the various circuits of FIG. 6, the output from timing logic circuit 83 is supplied to a delay circuit 93 which, after a suitable delay, acts to reset the counters 79, 80, 81, 81a and 82 along with the logic decision circuit 85 (if logic decision circuit 85 utilizes digital techniques). The delay time of delay circuit 93 is selected such that the logic decision circuit 85 will have a chance to determine which one of the counters 79, 80, 81 or 81a has the greatest stored count and to set one of the flip-flops 90, 91, 92 or 92a. Thus, after one of these flip-flops 90, 91, 92, or 92a has been set, a pulse is generated from delay circuit 93 to reset these various circuits for the next depth interval. The flip-flops 90, 91, 92 and 92a are reset directly by the output of timing logic circuit 83 so as to clear the flip-flops for the new logic decision from logic decision circuit 85.

Thus, in operation, the apparatus of FIG. 6 can identify the set of major lithological constituents no matter how many possibilities of such major lithological components there are. FIG. 6 performs this operation by first utilizing the computed lithology indices M and N to determine which triangle X, Y, Z or W each particular computed M,N point falls into. This operation is performed by lithology logic computer 78. Then the counters 79, 80, 81 and 81a count the M,N points falling into each individual triangle and after a given depth interval, as determined by timing logic circuit 83 and memory 89, the logic decision circuit 85 acts to determine which one of the triangles X, Y, Z or W has received the greatest density of points. Then, the logic decision circuit 85 energizes one of the matrix computers 86, 87 or 88 via the flip-flops 90, 91, 92 and 92a to compute the percentage of bulk volume contributed by the three major lithological constituents plus porosity. This operation can be performed over and over again through the length of the borehole or it can be performed for only a given desired depth interval. The length of the depth interval which is to be considered can be controlled by merely changing the timing of timing logic circuit 83 and memory 89. Likewise, even though only four lithological constituents have been considered in this embodiment, thus giving rise to four possible solutions, i.e., four triangles, it is to be understood that the teachings of the present invention could be carried to as many lithological constituents as desired. While it was not shown in FIG. 6, it is to be understood that the movable oil plot could also be used with the apparatus of FIG. 6 in the same manner as discussed in connection with FIG. 3.

There is one other point that should be mentioned in connection with the present invention and that concerns the possibility of more than three major lithological constituents occurring in any given formation. If this should happen, it is possible that the wrong three major lithological constituents will be selected. When this happens, the answer for one of the major lithological constituents may become a negative number. Since it is impossible to have a negative percentage of anything, it is known right away that the answer is wrong. It has been discovered that another lithological constituent which is suspected to be the proper constituent can be substituted for each one of the three originally selected major lithological constituents three separate times and three separate solutions obtained. Then, the answer which provides all positive answers along with the least positive value of the fourth lithological constituent is selected. This fourth constituent can be ascertained from the M,N plot by selecting a triangle with the next highest density of computed M,N points. By this arrangement, it has been found that fairly accurate results can be obtained.

Taking an example of this, in the FIG. 5 case, the major lithological constituents were found to be dolomite D, limestone L, and sandstone S, as discussed earlier. However, if the matrix solution should provide one or more negative answers to this combination, then anhydrite may be selected as the fourth constituent since the triangle X has the next greatest density of computed M,N points. Then, solutions are obtained by substituting anhydrite for dolomite D, limestone L, and sandstone S in three separate matrix solutions. The answer, with all positive solutions in which anhydrite A has the lowest positive percentage is chosen as the correct solution. It has also been found that with this procedure, the value of porosity computed by the matrix computer will be substantially accurate for all positive answers.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

I claim:
1. A method of machine processing well-logging data derived from apparatus lowered in a borehole for investigating subsurface earth formations, comprising:
  a. deriving a plurality of measurements representative of the sonic travel time, bulk density, and hydrogen content of an adjoining formation;
  b. computing with a machine certain lithology indices from said derived measurements, said indices being indicative of which constituents are present in a formation; and
  c. recording said lithology indices as a function of borehole depth for subsequent use in interpreting the derived measurements.

2. The method of claim 1 wherein said lithology indices are $$M = \frac{\Delta t_F - \Delta t}{\rho_B - \rho_F} \text{ and } N = \frac{H_F - \phi_N}{\rho_B - \rho_F}$$

where
  $\Delta t_F$ is the sonic travel time of the interstitial fluid,
  $\Delta t$ is the measured sonic travel time of the formation,
  $\rho_B$ is the measured bulk density of the formation,
  $\rho_F$ is the interstitial fluid density,
  $H_F$ is the hydrogen index of the formation interstitial fluid, and
  $\Phi_N$ is the measured porosity derived from the hydrogen content measurement.

3. A method of machine processing well-logging data derived from apparatus lowered in a borehole for investigating subsurface earth formations, comprising:
  a. deriving a plurality of measurements representative of the sonic travel time, bulk density and hydrogen content of an adjoining formation;
  b. computing with a machine certain lithology indices from said derived measurements, said indices being representative of which constituents are present in a formation; and
  c. using said computed lithology indices to identify at least a portion of the lithological constituents that are present in any given investigated formation.

4. The method of claim 3 wherein said lithology indices are:

$$M = \frac{\Delta t_F - \Delta t}{\rho_B - \rho_F} \text{ and } N = \frac{H_F - \phi_N}{\rho_B - \rho_F}$$

where
  $\Delta t_F$ is the sonic travel time of the interstitial fluid,
  $\Delta t$ is the measured sonic travel time of the formation,
  $\rho_B$ is the measured bulk density of the formation,
  $\rho_F$ is the interstitial fluid density,
  $H_F$ is the hydrogen index of the formation interstitial fluid, and
  $\Phi_N$ is the measured porosity from the measured hydrogen content.

5. The method of claim 4 wherein each lithological constituent has a unique set of lithology indices and the step of using said lithology indices to identify the lithological constituents comprises comparing the numerical relationship between the computed lithology indices and the unique lithology indices for the various lithological constituents to identify the major lithological logical constituents in the formation.

6. The method of claim 5 and further including the step of computing the percentage of bulk volume contributed by the identified major lithological constituents and porosity.

7. The method of claim 4 wherein each lithological constituent has a unique set of lithology indices, the lithology indices are computed over a given depth interval, and the step of using said lithology indices to identify the lithological constituents comprises comparing the numerical relationship between the lithology indices for the various lithological constituents and a plurality of the computed lithology indices to identify the major lithological constituents of the formation.

8. The method of claim 7 wherein the step of comparing the relationship between lithology indices to identify the major lithological constituents comprises the steps of:
  1. comparing each computed set of lithology indices M,N with the unique lithology indices for a plurality of sets of lithological constituents to determine which set of lithological constituents each computed set of lithology indices M,N is defined by;
  2. counting the computed sets of lithology indices defined by each set of lithological constituents over a given depth interval; and
  3. comparing the number of computed lithology indices sets M,N for each of the plurality of sets of lithological constituents to determine which set of lithological constituents defines the greatest number of computed lithology indices sets M,N over said given depth interval to identify the major lithological constituents of the formation.

9. The method claim 8 and further including the step of computing the bulk volume of the formation contributed by the identified major lithological constituents and porosity.

10. The method of claim 9 and further including the steps of:
  a. deriving measurements of the electrical resistivity of first and second radial portions of the formation;
  b. converting the first and second resistivity measurements into measurements indicating the amount of conductive fluid in the respective formation portions; and
  c. comparing the computed porosity and the converted resistivity measurements to obtain indications of the amounts of the different types of fluids that may be present in the formation.

11. Apparatus for processing well-logging data derived from apparatus lowered in a borehole for investigating subsurface earth formations, comprising:
  a. means for deriving a plurality of measurements representative of the acoustic travel time, bulk density, and hydrogen content of an adjoining formation;
  b. means for computing certain lithology indices from said derived measurements, said indices being indicative of which constituents are present in a formation; and
  c. means for recording said lithology indices as a function of borehole depth.

12. The apparatus of claim 11 wherein said plurality of derived measurements are combined by said computing means to produce said lithology indices M and N in accordance with the expressions:

$$M = \frac{\Delta t_F - \Delta t}{\rho_B - \rho_F} \text{ and } N = \frac{H_F - \phi_N}{\rho_B - \rho_F}$$

where
- $\Delta t_F$ is the sonic travel time of the interstitial fluid,
- $\rho_F$ is the interstitial fluid density,
- $H_F$ is the hydrogen index of the formation interstitial fluid,
- $\Delta t$ is the measured sonic travel time,
- $\rho_B$ is the measured bulk density, and
- $\Phi_N$ is a measurement of porosity from the hydrogen content measurement.

13. Apparatus for processing well-logging data derived from apparatus lowered in a borehole for investigating subsurface earth formations, comprising:
   a. means for deriving a plurality of measurements representative of the sonic travel time, bulk density, and hydrogen content of an adjoining formation;
   b. means for computing certain lithology indices from said derived measurements, said indices being indicative of which constituents are present in a formation; and
   c. means responsive to said lithology indices for identifying the major lithological constituents.

14. The apparatus of claim 13 wherein said plurality of derived measurements are combined by said computing means to compute said lithology indices M and N in accordance with the expressions:

$$M = \frac{\Delta t_F - \Delta t}{\rho_B - \rho_F} \text{ and } N = \frac{H_F - \phi_N}{\rho_B - \rho_F}$$

where
- $\Delta t_F$ is the sonic travel time of the interstitial fluid,
- $\rho_F$ is the interstitial fluid density,
- $H_F$ is the hydrogen index of the formation interstitial fluid,
- $\Delta t$ is the measured sonic travel time,
- $\rho_B$ is the measured bulk density, and
- $\Phi_N$ is a measurement of porosity derived from the measured hydrogen content.

15. The apparatus of claim 14 wherein each lithological constituent has a unique set of lithology indices and the means for identifying the major lithological constituents includes means for comparing the computed lithology indices with the unique lithology indices for the lithological constituents and generating a signal indicative of the major lithological constituents.

16. The apparatus of claim 15 and further including means responsive to the generated signal indicative of the major lithological constituents and the measurements representative of sonic travel time $\Delta t$, neutron derived porosity $\Phi_N$, and bulk density $\rho_B$ for generating signals representative of the percentages of bulk volume contributed by the identified major lithological constituents and porosity.

17. The apparatus of claim 14 wherein each lithological constituent has a unique set of lithology indices and the means for identifying the major lithological constituents includes:
   1. means for comparing the computed lithology indices for a plurality of depth levels with the unique lithology indices for the lithological constituents to determine which one of a plurality of sets of 2. constituents each computed lithology indices set M,N is defined by, and generating signals representative thereof; and
   2. means responsive to the generated signals for a plurality of depth levels for indicating which one of the sets of lithological constituents defines the greatest number of computed M,N sets to identify the major lithological constituents.

18. A method of machine processing well-logging data derived from apparatus lowered in a borehole for investigating subsurface earth formations, comprising:
   a. deriving a plurality of measurements representative of the sonic travel time, bulk density and hydrogen content of an adjoining formation;
   b. generating signals representative of the sonic travel time, density, and hydrogen index of the interstitial fluid;
   c. combining with a machine said derived measurements and generated signals in a certain relationship to produce at least one lithology indicia representative of which lithological constituents are present in a formation;
   d. recording said lithology indicia as a function of the depth at which said measurements were derived.

19. A method of machine processing well-logging data derived from apparatus lowered in a borehole for investigating subsurface earth formations, comprising:
   a. deriving a plurality of measurements representative of a plurality of characteristics of an adjoining formation;
   b. computing with a machine lithology indices from said derived measurements, said indices being representative of which constituents are present in a formation; and
   c. comparing with a machine the relationship of said computed lithology indices to the unique lithology indices for the lithological constituents of a plurality of sets of such lithological constituents and generating a signal representative of which set of lithological constituents best defines said computed lithology indices.

20. The method of claim 19 and further including the steps of repeating the steps of deriving, computing, and comparing for a plurality of depth levels in a borehole, counting the number of computed lithology indices which are defined by each set of lithological constituents, and producing a signal representative of which set of constituents defines the greatest number of computed lithology indices.

21. A method of machine processing well-logging data derived from apparatus lowered in a borehole for investigating subsurface earth formations, comprising:
   a. deriving a plurality of measurements representative of a plurality of characteristics of an adjoining formation;
   b. computing with a machine lithology indices from said derived measurements, said indices being representative of which constituents are present in a formation; and
   c. generating an output signal indicative of whether the computed indices are within certain limits defined by unique lithology indices for a set of lithological constituents whereby the presence of said set of lithological constituents in a formation will be indicated if said computed indices are within said certain limits.

22. The method of claim 21 wherein the step of generating an output signal includes using said computed lithology indices to determine if said computed indices are within limits defined by mathematical expressions giving the connections between the sets of unique indices for each lithological constituent of said set of constituents, and generating said output signal in a state to indicate that the formation under investigation is made up of at least said set of lithological constituents if said computed indices are within said limits.

UNITED STATES PATENT OFFICE
CERTIFICATE OF CORRECTION

Patent No. 3,590,228      Dated June 29, 1971

Inventor(s) Jack A. Burke

It is certified that error appears in the above-identified patent and that said Letters Patent are hereby corrected as shown below:

IN THE CLAIMS:

Column 13, claim 17, line 61, before "constituents" delete "2." and substitute --lithological--.

Signed and sealed this 15th day of May 1973.

(SEAL)
Attest:

EDWARD M. FLETCHER, JR.
Attesting Officer

ROBERT GOTTSCHALK
Commissioner of Patents